United States Patent
Curt et al.

(10) Patent No.: US 7,982,596 B2
(45) Date of Patent: Jul. 19, 2011

(54) METHOD AND APPARATUS FOR A POWER LINE COMMUNICATIONS TEST SYSTEM

(75) Inventors: Walter Curt, Harrisonburg, VA (US);
Glen K. Shomo, Harrisonburg, VA (US);
Christopher Mullins, Penn Laird, VA (US)

(73) Assignee: Power Monitors, Inc., Mount Crawford, VA (US)

( * ) Notice: Subject to any disclaimer, the term of this patent is extended or adjusted under 35 U.S.C. 154(b) by 593 days.

(21) Appl. No.: 11/849,648

(22) Filed: Sep. 4, 2007

(65) Prior Publication Data

US 2008/0055067 A1    Mar. 6, 2008

Related U.S. Application Data

(60) Provisional application No. 60/824,379, filed on Sep. 1, 2006.

(51) Int. Cl.
*G08B 29/00* (2006.01)
*G08B 1/08* (2006.01)
*H04M 11/04* (2006.01)

(52) U.S. Cl. ............ 340/514; 340/538; 340/538.15; 340/538.17; 340/12.32; 340/12.37

(58) Field of Classification Search ............ 340/514, 340/310.11, 310.16, 310.18, 538, 538.15, 340/538.17
See application file for complete search history.

(56) References Cited

U.S. PATENT DOCUMENTS

| | | | | |
|---|---|---|---|---|
| 3,516,063 A | * | 6/1970 | Sanders et al. | 340/3.3 |
| 5,241,283 A | * | 8/1993 | Sutterlin | 330/51 |
| 5,491,463 A | * | 2/1996 | Sargeant et al. | 340/310.16 |
| 6,317,031 B1 | * | 11/2001 | Rickard | 307/3 |
| 6,792,337 B2 | * | 9/2004 | Blackett et al. | 700/295 |
| 7,460,467 B1 | * | 12/2008 | Corcoran | 370/208 |
| 2006/0071776 A1 | * | 4/2006 | White et al. | 340/538 |
| 2006/0190209 A1 | * | 8/2006 | Odom | 702/127 |

* cited by examiner

*Primary Examiner* — Donnie Crosland
(74) *Attorney, Agent, or Firm* — K&L Gates LLP

(57) ABSTRACT

A system for testing PLC equipment, network conditions, and protocol performance is provided. Noise measurements can be made at a single point, and protocol traffic, signal levels, and upper-layer parameters of any transmissions by other equipment on the same network are logged. Alternatively, a plurality of units located at different points in the PLC network are at least part of a distributed test system. As a result, coordinated tests can be conducted by multiple nodes, such as point-to-point network transfer function measurement and analysis, estimation of the location of noise sources and system null and resonances, receiver operating curve (ROC) measurements with actual protocol modulation, or any other suitable tests. Preferably, the test devices are able to test using a plurality of PLC protocols. In some devices, PLC protocol-specific modules can be added or removed as desired to increase, decrease or change the test device's protocol abilities.

21 Claims, 3 Drawing Sheets

METHOD AND APPARATUS FOR A POWER LINE COMMUNICATIONS TEST SYSTEM

RELATED APPLICATIONS

This application claims the benefit of U.S. Provisional Patent Application Ser. No. 60/824,379 entitled "METHOD AND APPARATUS FOR SWAPPABLE PLC MODULES" and filed on Sep. 1, 2006, the entire contents of which is hereby incorporated by reference.

BACKGROUND

Although various Power Line Communication (PLC) systems have been introduced over the years, no scheme has proven reliable and inexpensive enough to become widespread. Difficulties present in the powerline environment, including noise, severe resonances, complex topologies, large attenuation, and time-varying parameters, have prevented several schemes from achieving reliable communication. Recent advances in technology, include inexpensive microcontroller and digital signal processors, have improved modern PLC schemes' chances of success. However, PLC success is still not assured, and as a result, a need for PLC-specific test equipment exists. Without such test equipment, it would be difficult or impossible for a PLC system to be successfully planned, deployed, and maintained.

There are two fundamental classes of PLC protocols, specifically control protocols and broadband protocols (referred to as Broadband over Power Lines, or BPL). Control protocols are typically low-bandwidth, less complicated, and used mainly for device control and automation, such as lighting control or other similar applications. Control protocols include, but are not limited to, X-10, INSTEON, KNX, UPB, LonWorks, and CEBus. These protocols are generally below 500 kHz, but can be at any suitable frequency. BPL protocols are high bit-rate, broadband, typically in the range of 1-30 MHz, but can be at any suitable frequency. BPL protocols include, but are not limited to, HomePlug (1.0, Turbo, and AV), HD-PLC, and OPERA. These protocols can be used for high-speed LAN activity such as internet access, streaming A/V content or any other suitable application. Modulation schemes are complex, and are generally based on orthogonal frequency-division multiplexing (OFDM). The two PLC classes were not designed to work together, but are often present in the same powerline network, and can interfere with each other.

SUMMARY

A system for testing PLC equipment, network conditions, and protocol performance is provided. In one embodiment, noise measurements are made at a single point, and protocol traffic, signal levels, and upper-layer parameters of any transmissions by other equipment on the same network are logged. In another embodiment, a plurality of units located at different points in the PLC network are at least part of a distributed test system. As a result, coordinated tests can be conducted by multiple nodes, such as point-to-point network transfer function measurement and analysis, estimation of the location of noise sources and system null and resonances, receiver operating curve (ROC) measurements with actual protocol modulation, or any other suitable tests. Preferably, such data is available in real-time to the user, and also logged by the distributed system over time, to track the time-varying nature of the PLC network; however, neither real-time availability nor logging and/or tracking is required. In one embodiment, measurements are controlled by a user via a handheld PDA, cell phone, PC, or any other suitable electronic device located on-site or remotely. In another embodiment, units are deployed without a central controller. The units begin measurements and logging automatically for later download and analysis.

In one embodiment, a testing system is used without an existing PLC infrastructure. For example, a testing system is used in an engineering survey to see if a particular protocol is suitable for the location being tested. In this case, the system performs noise and network analysis functions, as well as protocol-specific tests for one or more PLC protocols. The results can be used to estimate which, if any, PLC protocols are best suited for the location, how well they will perform, and what modifications may be necessary for a successful deployment or for any other suitable purpose. As an example, a large commercial building may be instrumented to determine which of the BPL systems (e.g. HomePlug, Opera, or HD-PLC or any other suitable BPL protocol) will be most suitable, before any deployment is performed.

In one embodiment, a test system is used with an existing PLC infrastructure. In this case, additional measurements and logging are possible. Preferably, all network traffic from the existing infrastructure is monitored, in addition to the normal measurements; however, any suitable amount of monitoring and measurement can be performed. In one embodiment, the test units send and receive messages through the existing infrastructure for further testing. Such an embodiment can be used to monitor an existing deployment to provide quantitative performance measurements, help troubleshoot problem areas, and also possibly survey the building in advance of deploying a second PLC protocol or for any other suitable purpose. In one embodiment, if multiple protocols are already present, more advanced tests are conducted by the units, including simultaneous exercising of the existing PLC devices to measure interference factors. In another embodiment, the test system also monitors the performance of systems in which one or more PLC protocols and one or more control protocols are employed.

DETAILED DESCRIPTION

In one embodiment, a test device includes a main controller, a digital signal processor (DSP), analog front end (AFE), codec, protocol-specific circuitry, and one or more communication links. The main controller coordinates and records measurement functions performed by the DSP, communicates with other device located in the power system, and interfaces with a host PC or PDA for data viewing, download, initialization, and any other suitable actions. The main controller also interfaces to any protocol-specific controller chips associated with the device.

In one embodiment, the DSP performs the actual instrument measurement functions, including spectral analysis, physical layer protocol analysis, and/or any other suitable analysis. The protocol-specific circuitry is preferably the reference design recommended by the manufacturer, and enables the device to send/receive messages in exactly the same fashion as end-user equipment; however, protocol-specific circuitry can have any suitable design and can enable any suitable communications. The DSP and main controller are coupled to this circuitry and can vary protocol parameters (e.g. signal level, sending special test patterns, or any other suitable parameters.) for special tests.

Figure 1:
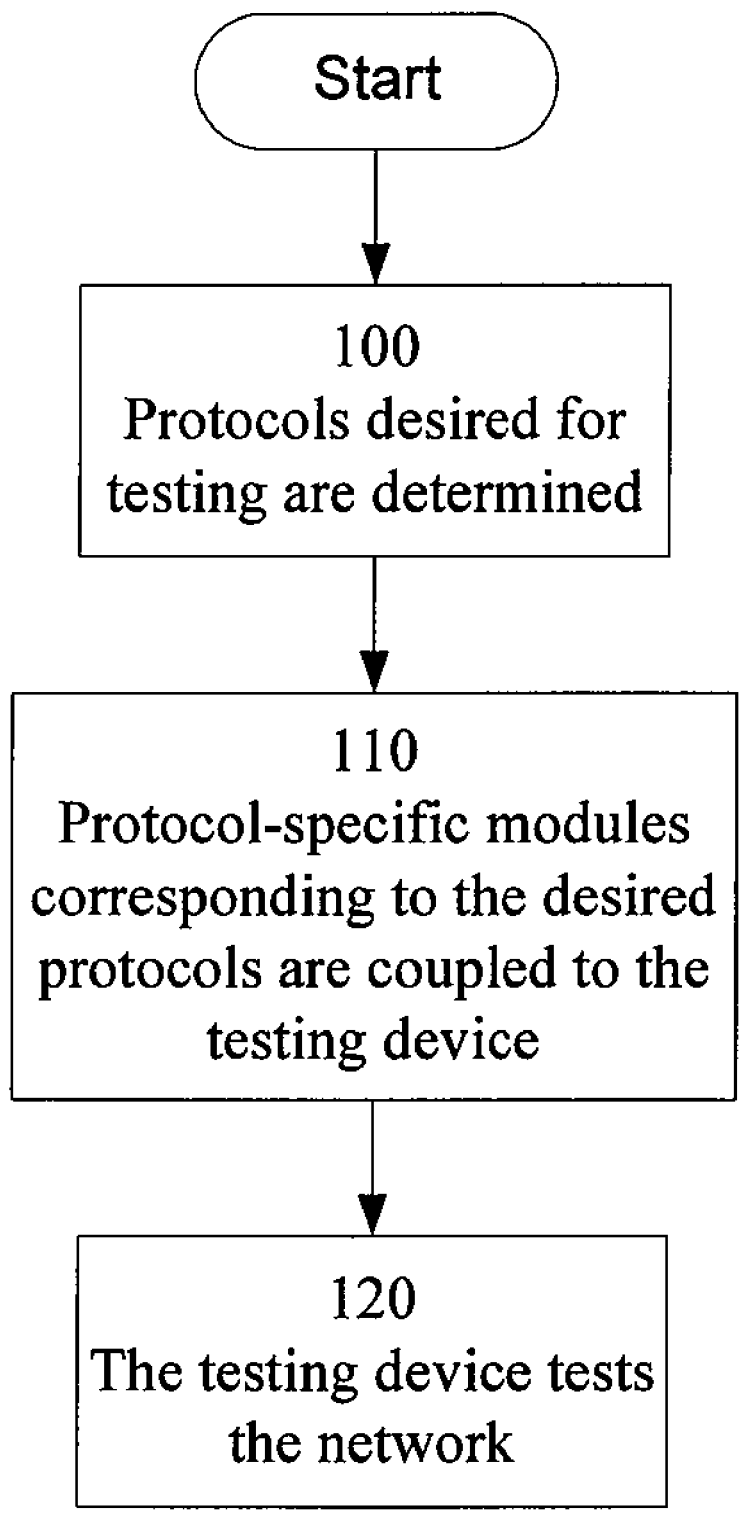
FIG. 1 is a flow diagram of the process of testing a network using a device having swappable modular protocol-specific circuitry in accordance with one embodiment

In one embodiment, the main controller and DSP functions are combined into one processor of sufficient capability. In another embodiment, the protocol-specific circuitry is not needed because the protocol can be emulated exactly by the DSP and its analog front end. In various other embodiments, multiple protocols are present in one device or are at least partly implemented in the DSP software. In still another embodiment, the device is configured such that the protocol-specific circuitry is on a daughter circuit board, enabling users to swap protocol modules as needed. FIG. 1 illustrates the process of testing a network using a device having swappable modular protocol-specific circuitry in accordance with one embodiment. At block 100, the protocols desired for testing are determined. At block 110, protocol-specific modules corresponding to the desired protocols are coupled to the testing device. At block 120, the testing device tests the network.

Figure 2:
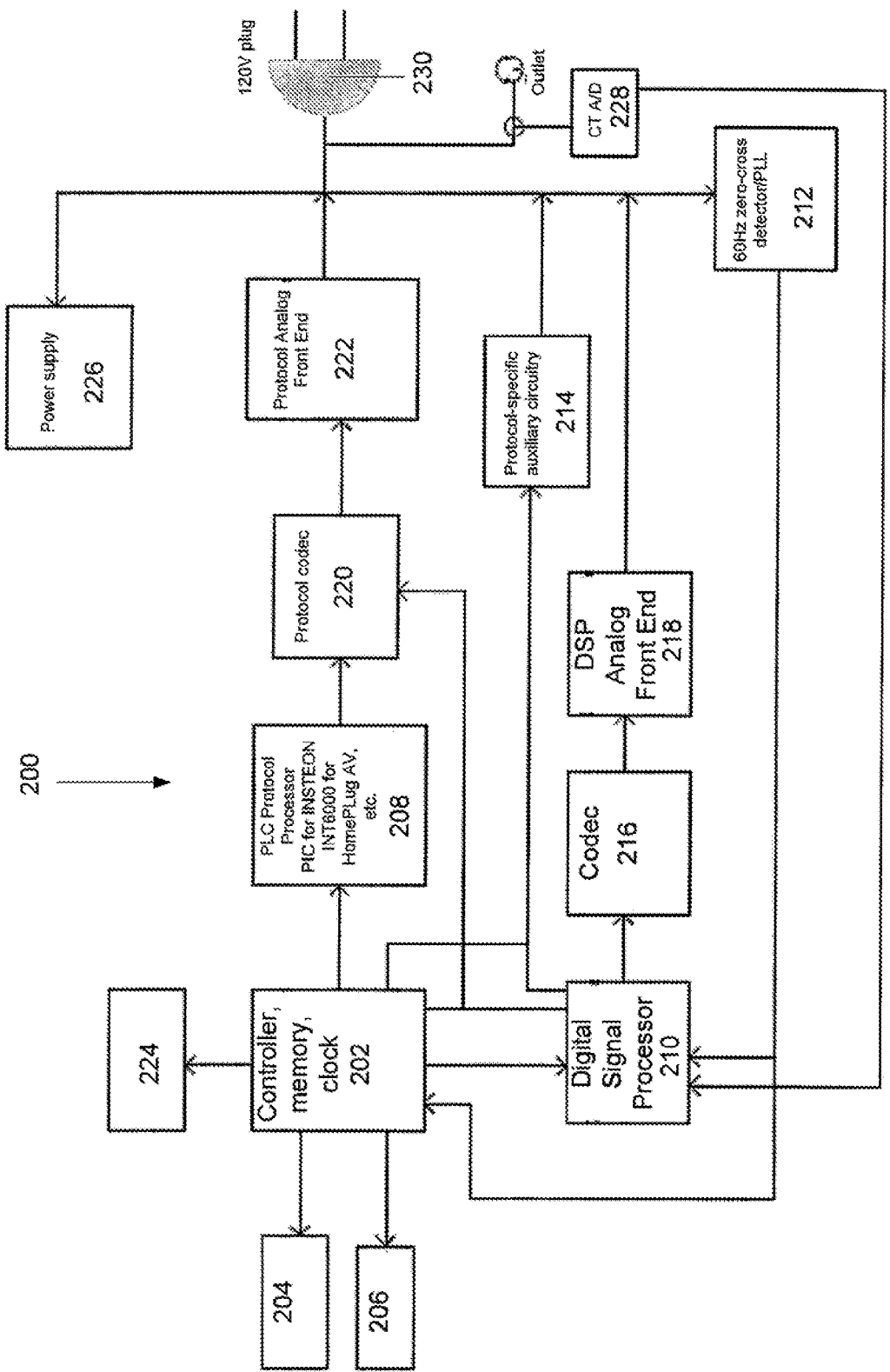
FIG. 2 is a block diagram of testing device in accordance with one embodiment.

A testing device in accordance with one preferred embodiment is shown in the FIG. 2. In this embodiment, the device 200 is a plug-in unit that plugs in to a standard 120V receptacle, like many PLC devices. The 120V line is used to power the unit as well. A 120V pass-through receptacle on the device allows a load to be plugged into it, and the current drawn by this load is monitored. This allows correlations between load operation and PLC network operation to be determined.

The device 200 includes a controller module 202. This is the master controller for the entire device 200. It presents a USB device port 204 and link interface 206 to a PC or PDA, and can also use the link to talk to other PLC test devices. The controller 202 interfaces to the PLC protocol processor 208 to send/receive test messages, and also to the DSP 210, to initiate and receive high-speed sample data. It is also wired to receive input from the zero-cross detector 212, and can control the protocol auxiliary circuit 214.

The link module 206 allows the device to communicate with other devices for coordinated tests. Tests such as transfer function measurement, point-to-point receiver operating curve measurements, and/or other suitable tests require coordinated transmission and reception by at least two devices. This link 206 is typically an RF link such as ZigBee, WiFi, or any other suitable protocol, preferably one supporting ad-hoc mesh networks. Since the bandwidth of this link 206 may be less than the PLC protocol under test, special techniques can be used to accurately synchronize the devices with it, if desired. In some embodiments, hardwired links (e.g., Ethernet, USB or any other suitable protocol) are used. In other embodiments, a PLC protocol may be used as the link, including the PLC protocol being tested.

In various embodiments, this link 206 may also be used for communication with a host PC, PDA, cell phone, or any other suitable device. A user may connect to the link 206 for real-time control and data display of the connected device, and any other devices connected through the link by the first device, or present on a link mesh network. In other embodiments, settings and data can be uploaded or downloaded from a user or external controller through this link 206. In one embodiment, the host is remotely located, and accessed locally through a LAN connection (e.g., via the World Wide Web or any other suitable protocol).

In one embodiment, the USB device port 204 is the preferred link for connecting the controller 202 to a host PC or PDA. This port 204 allows high-speed transfer of recorded data and real-time display or any other suitable activities. In some embodiments, the port 202 is used to transfer real-time or near-real-time data from the DSP 210 for further signal analysis on the PC.

In one embodiment, the Digital Signal Processor 210 interfaces with the high-speed codec 216. The DSP 210 can read high-speed A/D samples, and send out test patterns with the codec D/A. Preferably, these actions are performed under command of the controller 202; however, the actions can be performed without controller 202 control. In one embodiment, the DSP 210 performs some data processing before sending the results back to the controller 202. The DSP 202 also connects to the zero-crossing circuit 212 for synchronization, and the auxiliary circuitry 214, in case it is desirable for the DSP 210 to control the circuitry 214 instead of the ARM. In one embodiment, the DSP doesn't do any long-term data storage, but it has scratchpad memory (e.g., a small SDRAM chip or any other suitable memory) and a serial Flash to boot from or any other suitable memory used for any suitable purpose. An example of a DSP 210 suitable for one embodiment is a fixed-point Blackfin series from Analog Devices.

In one embodiment, the codec 216 performs high-speed A/D and D/A functions, under control of the DSP 210. In one embodiment, a programmable logic chip enables the DSP 210 to sample at the full 80 MHz rate or higher rate necessary for BPL protocols. An example of a codec 216 suitable for use in one embodiment is the Analog Devices AD9866. This codec 216, along with the DSP 210, implement a tracking generator function.

In another embodiment, a DSP Analog Front End 218 provides amplification and low-impedance drive to transmit the D/A output of the coded, and also variable gain for the coded A/D. In addition, it includes a coupling network and bandpass filtering. However, the DSP Analog Front End 218 can have any suitable abilities. Separate AFEs for control and BPL protocols may be used for different embodiments, or a wide-bandwidth common AFE may be used, with the DSP 210 performing further bandpass filtering in software.

In one embodiment, a 60 Hz zero-cross detector/PLL 212 extracts the 60 Hz zero-crossing time. It sends the output to both the controller 202 and the DSP 210.

In another embodiment, protocol-specific auxiliary circuitry 214 is included. The details of module are different for each specific protocol. For INSTEON, this is an extra PIC, analog mux, and other suitable circuitry. X10 and the other low-frequency protocols have a similar circuit. In various embodiments, the high-speed protocols also have an analog mux. Some embodiments implement more than one protocol. In one such embodiment, auxiliary circuitry 214 for multiple protocols is present. This circuitry generally allows the DSP 210 to alter characteristics of the protocol-specific section, such as transmit/receive signal levels, or any other suitable characteristics, or exercise that hardware directly outside the control of the protocol processor 208.

In another embodiment, a PLC Protocol Processor 208, Protocol codec 220 and protocol AFE 222 are included. In one embodiment, these components implement the reference PLC protocol design. For INSTEON, it is the INSTEON PIC, plus its analog circuitry—the "AFE" is a transformer and a passive network. The codec is a transmitter transistor and a resistor going into the PIC.

For the high-speed protocols, preferably the reference schematic and layout provided for each one is implemented. Typically these consist of a processor (usually ARM-based), SDRAM and serial Flash, an AD9866 or similar codec, and AFE. One change present in one embodiment for the high-speed protocols is a method for the DSP 210 and main controller 202 to adjust the transmit level and input attenuation.

Using the specific reference design for each protocol rather than re-implementing this in the DSP 210 or main controller 202 enables the unit to exactly duplicate the performance of actual protocol hardware, including bugs or undocumented performance characteristics. However, it should be understood that the protocols can be implemented in less than exact manners, if desired.

In one embodiment, a Protocol RF 224 is included. If the PLC protocol has an RF interface 224, this interface 224 is connected to the main controller 202. An A/D may be needed to sample the RSSI output from the RF receiver 224. Control protocols such as INSTEON include an RF channel, which must be incorporated for full protocol analysis.

In another embodiment, a power supply 226 provides isolated 3V, 5V, and other voltages as needed. In still another embodiment, a CT (Current Transformer) A/D 228 measures current through the receptacle. This enables correlation with load current and unit signal measurements, to help determine if specific loads are interfering.

In various embodiments, a 120V Plug, Outlet 230 is used to plug into a wall socket. The outlet lets the user plug a load into the device, and the 120V is passed through to the outlet. The DSP 210 can measure the current of the connected load using the CT A/D 228.

In one embodiment, all data recording is done by the controller 202, and it accordingly includes memory for data storage. However, data recording can be performed in any suitable location in various embodiments. An example of a controller 202 suitable for use with one embodiment is an ARM processor, using SDRAM and Flash memory.

In other embodiments, the device is hardwired into a 120V, 240V, or three phase 208/120 or 480/277V system. In another embodiment, the basic device is incorporated into a circuit breaker form factor, or even embedded in a fully functional circuit breaker. For devices on medium voltage distribution power lines, suitable coupling means is preferred.

In another embodiment, the device also includes an RF analog front-end to measure radiated emissions from PLC networks. The RF analog front-end includes a suitable internal antenna and/or a connector for an external antenna, RF gain block, which may or may not have adjustable attenuation, and bandpass filtering. Portions of the standard AFE may be shared with the RF AFE. In this embodiment, the user can test for compliance with FCC radiated emissions limits.

In another embodiment, the controller function is performed by a PC or PDA or any other suitable device directly. In this embodiment, a USB device port is built into the host and a link module is either a host peripheral (e.g. a USB ZigBee adapter) or embedded in the device. In another embodiment, the DSP function also resides in the host PC or PDA or other suitable device, and only the analog front ends, codec, and protocol-specific hardware reside in the testing device. Communication from the host to the remaining device circuitry is preferably through USB or Ethernet links or any other suitable links; however, communication can be implemented in any suitable manner. In one embodiment, a central host incorporates the controller and/or the DSP functions of multiple devices.

In various embodiments, PC host software incorporates post-processing to compute network parameters based on aggregate data from multiple devices. This software also incorporates network data or topologies entered by the user, gathered from optical scans of electrical drawings, building plans, or one-line network diagrams, or constructed by the software from measurements of the devices themselves in various embodiments. In one embodiment, the PC software produces graphs and reports for the user to easily view all measurements.

Operation

The operation of an exemplary 120V plug-in embodiment is described below. It should be understood that other embodiments can have similar operation, with suitable adjustments for physical differences.

In this example embodiment, installation includes simply plugging one or more devices into 120V receptacles. Locations are preferably selected that cover the entire electrical system to be monitored; however, any suitable locations can be selected. In addition, any locations where it is known that PLC equipment will be installed (or is installed) is preferably monitored; however, such monitoring is not required. If there are loads suspected of interfering with PLC operation, devices are preferably placed near them, or more preferably, they should be plugged into the monitoring receptacle of the device; however, such locating of test devices is not required. Any existing plug-in PLC nodes are preferably plugged into the same receptacle as the device, so they are connected in parallel, however, test devices can be located in any suitable location and connected in any suitable manner.

As devices are installed, the controllers in the devices are powered up, and begin searching for other devices, and any hosts through the Link module. The installed devices form an ad-hoc mesh network using this port. A user may use a PDA or PC host or any other suitable device at any suitable time to see the device mesh network topology, and verify that all installed devices have joined the network.

After the devices are installed, they make protocol and network measurements. These measurements are logged with the default settings, or the previous recording settings. A user can change the recording parameters at any time, start a new recording, download existing data, or clear the device memory. Preferably, if user is connected to one device through either the Link or USB port, the user can also communicate with other devices in the mesh network through that port; however, such communication ability is not required.

The test devices also monitor for existing PLC devices, and join any detected PLC networks already in place. In addition to coordinated measurements among the devices themselves, the devices also coordinate to send test messages to existing PLC infrastructure, and also monitor messages within the existing PLC network for measurement purposes. The user may use the host display to view the status of the existing PLC devices, or to manually add the devices to an existing network if required.

Figure 3:
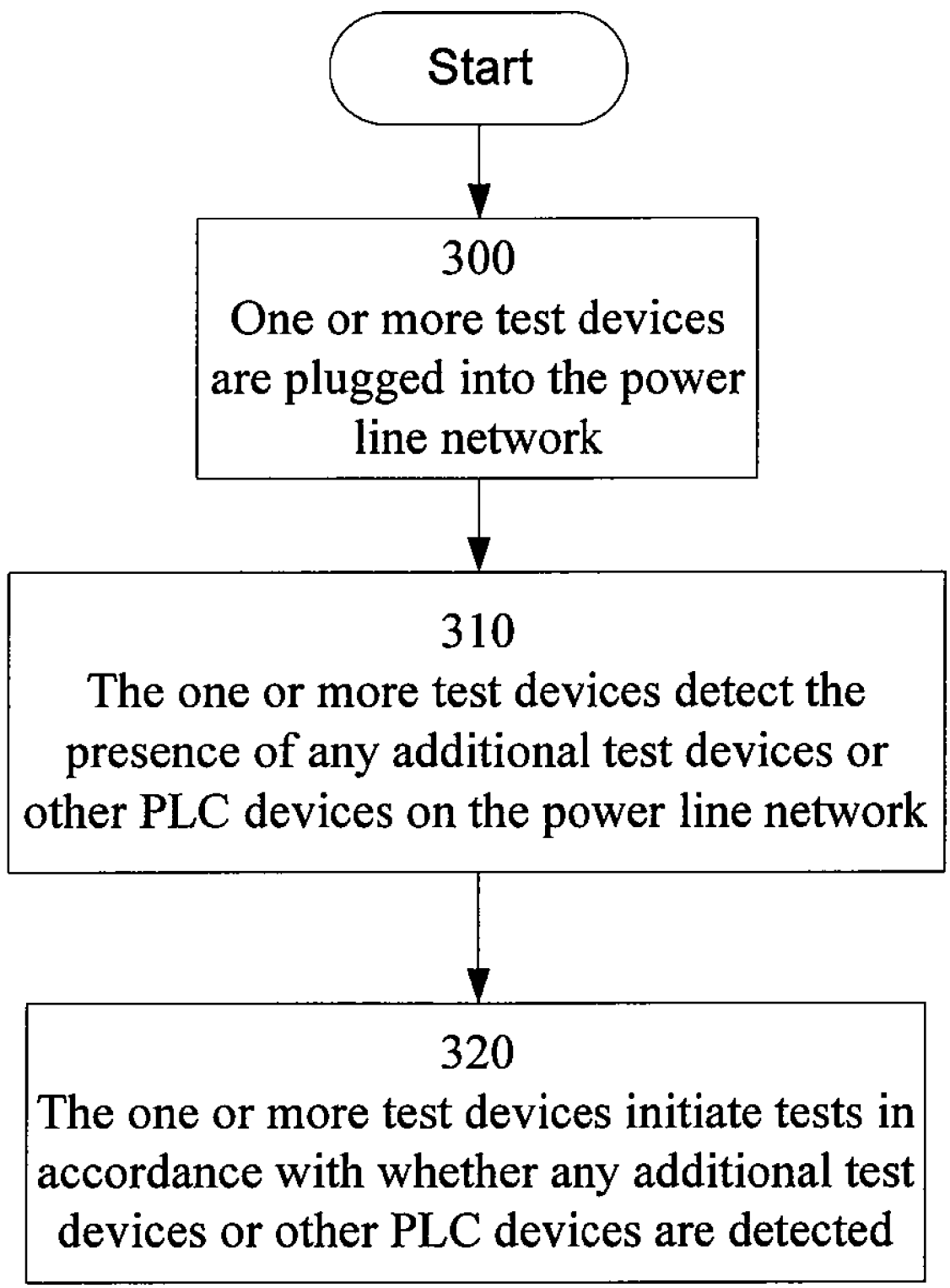
FIG. 3 is a flow diagram of the process of testing a network in accordance with one embodiment.

FIG. 3 illustrates the process of testing a network in accordance with one embodiment. At block 300, one or more test devices are plugged into the power line network. At block 310, the one or more test devices detect the presence of any additional test devices or other PLC devices on the power line network. At block 320, the one or more test devices initiate tests in accordance with whether any additional test devices or other PLC devices are detected.

In one embodiment, the user monitors the network status with the host PC or PDA or any other suitable device. With a PDA, the user may turn various electrical loads off and on, and see in real-time the effects on the PLC network under test. More specific measurements can also be examined to enable troubleshooting on the spot.

In another embodiment, the user leaves the devices in place for a length of time, such as one day or one week or any other suitable period. The devices log the selected parameters and the user can download and analyze the data offline with the host software. This makes it easier to perform analysis of intermittent network problems or to quantify time-varying network parameters.

In another embodiment, the devices are permanently installed. In this mode, the devices record indefinitely, and are typically initialized to overwrite older data as new data is recorded; however, any suitable recording scheme can be implemented, including those that detect a condition of interest and prevent recording over data related to conditions of interest until the user has had an opportunity to view, download, and/or store in long-term storage the data. The recorded data may be downloaded automatically on a scheduled basis for archival or long-term studies, or only when a network problem occurs or in any other suitable manner.

In an embodiment in which the devices are not installed permanently, the devices can be removed after the desired data has been gathered. The data may be downloaded into the host before or after they are uninstalled from service.

In one embodiment, the host software allows for examination of data from a single device and can combine data from multiple devices. Data may be analyzed separately or combined to compute further statistics.

Measurements

In various embodiments, many measurements are made by a single device. Such measurements can include fundamental measurements such as network impedance vs. frequency, noise power vs. frequency, or any other suitable measurements. Protocol-specific measurements are made in various embodiments. For example, in the case of INSTEON, noise in the INSTEON package time-slots on the 60 Hz waveform is measured separately in one embodiment. In OFDM-based systems, noise is computed separately for each OFDM channel in one embodiment. In various embodiments, these measurements are logged in stripchart format as well as statistically through histograms, and modeled parametrically by the DSP.

In one embodiment, a single test device interacts with an existing PLC infrastructure. By sending test messages with varying parameters (e.g. power level, timing variations, intentional bit-errors or other physical layer artifacts), the device can determine Receiver Operator Characteristic (ROC) curves for each PLC device. As a result, information about the PLC network is gathered, as is information about the performance of specific PLC pieces of equipment.

The test device also monitors PLC traffic on the network in one embodiment, logging errors, retries, and other lower and MAC layer protocol errors. Network problems at the MAC layer are logged. The PLC protocol block in the device is used for this function in one embodiment. In one embodiment, the device initiates traffic from one PLC node to another by sending packets with spoofed identities, or otherwise constructing messages that "trick" a PLC node into communicating with another PLC node, so that measurements may be made.

The test device intentionally injects noise, interfering carriers, or other signals into the powerline network while PLC traffic is occurring in one embodiment. By varying the characteristics of the injected signal, the device can determine the network sensitivity to interference of various types.

In one embodiment, the test device intentionally transmits messages with different PLC protocols at various power levels, while PLC traffic is occurring. This enables the device to determine the network sensitivity to other PLC protocols.

Raw waveforms, spectral measurements, or any other suitable measurements are recorded in various embodiments for post-processing by the host, which may include analysis in conjunction with other devices that were also recording, but not visible to the original device.

In various embodiment, if multiple devices are installed and communicating through a Link port, many more measurements are possible, due to the coordinated action of each controller and DSP.

One such measurement is network transfer function. In general, each DSP may measure 2-port and multiple-port network parameters (e.g. admittance, impedance, and scattering parameters) from its location in the network to each of the others. This information may be used by the host, which receives all the device measurements, to form an overall network model, which can be used to troubleshoot or estimate PLC network performance.

Specific transfer function measurements are made with swept-sine or broadband signal (e.g. white noise, spread-spectrum chip or chirp sequences, etc.) Generally one device would transmit, while all the others receive; however, any suitable transmission/reception scheme can be implemented. In one embodiment, the transmitting device measures its power output, and given its known, calibrated source impedance, the impedance at that point is computed. The other devices measure their received signal, either in a synchronous or non-synchronous fashion. Synchronization is achieved in various embodiments with clock data embedded in the transmitted signal, or through the Link port. Since the Link port's bandwidth may be low compared to the bandwidth under test, in various embodiments, phase lock synchronization is used on the timing signal sent over that link. If a high-accuracy external clock signal is available (e.g. GPS) in the embodiment, that may also or alternatively be used.

Other measurements made in various embodiments include signal to noise ratio (SNR), channel efficiency, Shannon limit for each channel and any other suitable measurements.

Averaging techniques are used by one embodiment to detect received signals below the nominal system noise floor. This may especially be useful if transfer functions are measured between devices that aren't on the same distribution transformer secondary. For example, two adjacent buildings may have separate distribution transformers. A transfer function between these two points will include losses from both transformers, and would typically require averaging and synchronization to make the measurement.

In one embodiment, each device can use its protocol-specific hardware to send valid protocol messages to each of the other devices. By varying the message transmission parameters (signal strength, timing, etc.) in a manner similar to the single-device case, ROCs may be mapped from each device to each of the other devices. Any detected PLC nodes on the network may also be included. Each device logs the data collected with its receiver, and a master host can aggregate data from all the devices to form the overall network measurement in this embodiment.

In some embodiments, all these transmissions are orchestrated by a PC or PDA host. In other embodiments, one test device is declared the network master via an arbitration scheme, and coordinates the transmissions of all the other devices. In distributed systems where not all devices can communicate directly with all others, the master role may be handed from one device to another to insure as much of the network as possible is covered. The master device may also be manually selected by the user.

In various embodiments, measurements are recorded on a periodic basis, or additionally, recorded when triggered by certain user-programmable events. Cross-triggering allows one device to trigger, and then quickly alert other devices to trigger. Circular buffers of sufficient length to allow simultaneous data recording are present in various embodiments. Periodic triggers are intentionally transmitted by some devices to cause other devices to record synchronously in various embodiments.

In one embodiment, the master device collects all the data from each of the other devices, so that only a single device needs to be downloaded by the user. The master device can collect and store the data without prompting from the user, or can retrieve the data for the user once the user indicates readiness to receive the data.

In addition to physical layer measurements, each device makes modulation-specific measurements in various embodiments. In the case of one embodiment having an OFDM-based system, this includes channels-specific versions of the preceding measurements, timing sensitivity measurements, and/or any other suitable measurements. The test devices inject signals designed to emulate other PLC protocols in order to test immunity or coexistence with them in various embodiments.

In various embodiments, measurements are correlated with "position on waveform" (i.e., determining whether parameters such as transfer function, noise, or other suitable parameters vary with the timing with respect to the powerline frequency). These cyclostationary statistics are computed by the DSP in one embodiment.

In other embodiments, measurements include compliance testing for conducted emissions limits for PLC transmitters. In one such embodiment, the testing device includes a more broad-band front-end to measure out-of-band emissions. Testing includes verification of band notches as required in various localities in one embodiment.

If a suitable internal or external antenna is present in one embodiment, radiated emissions compliance is tested, in a similar manner to conducted emissions. In various embodiments, NIST traceability is included.

In another embodiment, measurements include demodulated results such as bit-error rates, packet errors, or other suitable measurements. Block level statistics for OFDM in one embodiment include errors in cyclic prefix or other protocol-specific decoding problems. For control protocols such as INSTEON, bad checksum or other block errors would be recorded in another embodiment.

MAC layer measurements include collision detection, packet retries, negative acknowledgements, excessive network negotiation traffic, or other suitable measurements in one embodiment. In some cases, network problems may exist primarily at this level, especially in the case of incorrectly configured PLC nodes.

Any side-channel associated with a PLC protocol (e.g. the RF channel in INSTEON) is also monitored in one embodiment. In cases where the RF physical layer operates synchronously with the PLC physical layer, simultaneous measurements are made in one embodiment. Measurements include received signal strength, bit error rates, ROCs, or any other suitable measurements.

The DSP in each device occasionally listens for other PLC protocols that may appear on the network in various embodiments. For example, a user may not know that another protocol is in use and interfering with his network. The device attempts to detect all known PLC protocols when messages are received. This activity is recorded.

In various embodiments, the test device operates as a fully functional PLC transceiver for the specific protocol, performing all network operations (bridging, etc.), or it may not fully implement all PLC network protocols. For example, the controller may prevent the PLC hardware from participating in bridging activities, becoming a network master, etc., where this would interfere with the measurements. The MAC or higher layers may not be fully implemented or enabled, if not necessary to perform the required signal measurements and computations.

In some embodiments, low-level control of the PLC protocol is not feasible, due to the reference design architecture. One approach to force the PLC protocol system in the device to transmit certain messages is to inject pre-constructed messages into the PLC system codec chain, causing the PLC controller to respond with known transmissions. This can be done digitally by injecting a digital pattern representing the desired message between the coded and the PLC processor, or in the analog domain by having the DSP codec insert an analog signal into the PLC codec's input.

Another approach which may be used in another embodiment is to record the digital output from the PLC controller to its codec when it is transmitting certain desired messages. These messages are then replayed into the codec repeatedly as desired by the DSP or main controller, without using the PLC control system.

Another approach which may be used in another embodiment is to instruct the PLC system to transmit certain carefully constructed bit or block patterns. The modulation of these patterns have spectral characteristics which are advantageous for spectral measurements. For example, with OFDM, many hundreds of carriers are typically active in parallel, encoding thousands of bits. By carefully choosing the bit pattern, an OFDM output can be arranged so that only certain carriers, or even a single carrier, is active. By repeating this for many different carrier channels, a complete network sweep is performed. This technique is used in a test device of one embodiment which lacks the DSP subsystem and can only utilize PLC protocol hardware. This technique is also used on existing PLC hardware in various embodiments.

Time domain reflectometry (TDR) techniques are used in various embodiments to estimate physical location of powerline network nulls or resonances. This measurement involves measurements from multiple devices in various embodiments, and uses the host PC or PDA to utilize network structure knowledge (wiring diagrams, etc.) to improve the estimate.

In one embodiment, each device attempts to identify the location and source type of noise sources on the powerline network. Pattern recognition techniques are used to match received noise with a library of known noise sources. This library may be stored in the device, in the host, or accessed dynamically on a remote server over the World Wide Web.

Many different graphs and reports are available through the host software in various embodiments. High-level reports include overall network performance, both with any existing PLC infrastructure, and with hypothetical additions of various PLC protocol devices. Recommendations for optimal PLC protocol, node locations, or any other suitable recommendations are made, especially as part of a network survey, in one embodiment. Network performance metrics are compared to previous recordings to verify current performance against initial installation or other points in time in one embodiment. Estimated location and type of interference sources are identified, along with other detected PLC networks in another embodiment.

In other embodiments, other reports may indicate network traffic load, the ability to bear more PLC nodes, or any other suitable information. Specific graphs and reports on noise, triggered waveforms and spectral captures, are available for detailed analysis in another embodiment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A test device comprising:
    a power line interface;
    a signal detection unit configured to detect a first signal transmitted on a power line coupled to the power line interface;
    a signal generation unit configured to generate a second signal;
    a signal transmission unit configured to transmit the second signal on the power line; and
    a signal analysis unit configured to analyze at least one of physical layer modulation, noise, powerline transfer function, and communication statistics of the first or second signal.

2. The test device of claim 1, wherein the signal detection unit is associated with a PLC protocol.

3. The test device of claim 2, wherein the signal detection unit is removable from the test device.

4. The test device of claim 3, wherein a second signal detection unit is associated with a second PLC protocol and wherein said second signal detection unit is attachable to the test device to replace the signal detection unit if the signal detection unit is removed.

5. The test device of claim 1, further comprising a communications unit.

6. The test device of claim 5, wherein the communications unit is a USB device port, a link module or a protocol RF interface.

7. The test device of claim 1, further comprising a storage device configured to store data received from the signal analysis unit.

8. The test device of claim 7, wherein the storage device is configured to record data in a circular buffer.

9. The test device of claim 8, wherein the storage device is configured to prevent data associated with a condition of interest from being deleted or recorded over until a user has accessed the data associated with the condition of interest.

10. The test device of claim 1, wherein the signal analysis unit is configured to detect one or more conditions in which a first PLC protocol is interfering with a second PLC protocol.

11. A method of testing a power line communications network comprising:
    coupling one or more test devices to the power line communications network;
    analyzing the performance of a the power line communications network using a first PLC protocol, wherein the first PLC protocol utilizes a first physical layer modulation scheme or parameter; and
    analyzing the performance of the power line communications network using a second PLC protocol, wherein the second PLC protocol utilizes a second physical layer modulation scheme or parameter.

12. The method of claim 11, further comprising:
    detecting which, if any, PLC protocols are in use on the power line communications network.

13. The method of claim 11, further comprising:
    detecting automatically the presence of one or more test devices on the power line communications network.

14. The method of claim 11, further comprising:
    detecting automatically the presence of one or more PLC devices on the power line communications network.

15. The method of claim 11, wherein the power line communications network uses the first PLC protocol and the second PLC protocol at the same time.

16. The method of claim 11, further comprising:
    swapping a first PLC-specific module for a second PLC-specific module in a first one of the one or more test devices.

17. The method of claim 11, further comprising:
    designating a first one of the one or more test devices as a master device.

18. The method of claim 17, wherein the master device controls the operation of the other test devices.

19. The method of claim 17, wherein the master device records analysis data gathered by each of the one or more test devices.

20. The method of claim 11, further comprising:
    analyzing the compliance of the power line communications network with a government emissions regulation.

21. The method of claim 11, further comprising:
    characterizing one or more electrical parameters of the power line communications network.

* * * * *